US011136463B2

(12) United States Patent
Pietsch et al.

(10) Patent No.: US 11,136,463 B2
(45) Date of Patent: Oct. 5, 2021

(54) ONE-COMPONENT AQUEOUS COATING COMPOSITIONS CONTAINING POLYURETHANE AND PHYLLOSILICATES FOR OXYGEN BARRIER COATINGS

(71) Applicant: BASF SE, Ludwigshafen am Rein (DE)

(72) Inventors: Ines Pietsch, Ludwigshafen (DE); Konrad Roschmann, Ludwigshafen (DE); Christine Tonhauser, Ludwigshafen (DE); Kristina Georgieva, Mannheim (DE); Josef Breu, Bayreuth (DE); Patrick Feicht, Bayreuth (DE)

(73) Assignee: BASF SE

( * ) Notice: Subject to any disclaimer, the term of this patent is extended or adjusted under 35 U.S.C. 154(b) by 544 days.

(21) Appl. No.: 16/075,088

(22) PCT Filed: Jan. 25, 2017

(86) PCT No.: PCT/EP2017/051477
§ 371 (c)(1),
(2) Date: Aug. 2, 2018

(87) PCT Pub. No.: WO2017/133935
PCT Pub. Date: Aug. 10, 2017

(65) Prior Publication Data
US 2020/0291262 A1    Sep. 17, 2020

(30) Foreign Application Priority Data
Feb. 3, 2016  (EP) ..................................... 16153999
Mar. 29, 2016 (EP) ..................................... 16162613

(51) Int. Cl.
*C09D 5/00* (2006.01)
*C09D 7/61* (2018.01)
(Continued)

(52) U.S. Cl.
CPC .............. *C09D 5/00* (2013.01); *C08G 18/44* (2013.01); *C08G 18/48* (2013.01); *C08G 18/56* (2013.01); *C08G 18/722* (2013.01); *C08G 18/75* (2013.01); *C08G 18/76* (2013.01); *C08J 7/043* (2020.01); *C08J 7/048* (2020.01); *C08J 7/056* (2020.01); *C08K 3/36* (2013.01); *C08K 5/17* (2013.01); *C08L 75/04* (2013.01); *C09D 7/61* (2018.01);
(Continued)

(58) Field of Classification Search
CPC ...... C09J 175/00; C09J 175/02; C09J 175/04; C09J 175/06; C09J 175/08; C09J 175/10; C09J 175/12; C09J 175/14; C09J 175/16; C09D 175/00; C09D 175/02; C09D 175/04; C09D 175/06; C09D 175/08; C09D 175/10; C09D 175/12; C09D 175/14; C09D 175/16; C09D 7/61; C09D 7/70; C08L 75/04; C08L 75/06; C08L 75/08; C08L 75/10; C08L 75/12; C08L 75/14; C08L 75/16; C08K 5/17; C08K 3/346; C08K 3/36; C08J 2475/00; C08J 2475/02; C08J 2475/04; C08J 2475/06; C08J 2475/08; C08J 2475/10; C08J 2475/12; C08J 2475/14; C08J 2475/16; C08J 2367/00; C08J 2367/02; C08J 2367/03; C08J 2367/04; C08J 2367/06; C08J 2367/07; C08J 2367/08; C08J 7/02; C08J 7/04; C08J 7/042; C08J 7/0423; C08J 7/0427; C08J 7/043; C08J 7/44; C08J 7/046; C08J 7/048; C08J 7/05; C08J 7/052; C08J 7/054; C08J 7/056; C08J 7/06; C08J 7/065; C08J 7/08; C08J 2323/04; C08J 2323/06; C08J 2323/08; C08J 2323/10; C08J 2323/12; C08J 2323/14; C08J 2323/16; C08J 2323/18; C08J 2323/20; C08J 2323/22; C08J 2323/24; C08J 2323/26; C08J 2323/28; C08J 2323/30; C08J 2323/32; C08J 2323/34; C08J 2323/36
See application file for complete search history.

(56) References Cited

U.S. PATENT DOCUMENTS 3,412,054 A  11/1968  Milligan et al.
3,586,478 A   6/1971  Neumann et al.
(Continued)

FOREIGN PATENT DOCUMENTS

CN   1297470 A    5/2001
CN   103562248 A  2/2014
(Continued)

OTHER PUBLICATIONS

Shen, Meng, "Rheological Properties of Laponite and Chemically Modified Laponite Suspensions". Open Access Theses. 253, 2014. (Year: 2014).*

(Continued)

*Primary Examiner* — Christopher M Rodd
(74) *Attorney, Agent, or Firm* — Faegre Drinker Biddle & Reath LLP

(57) ABSTRACT

Described is an aqueous one-component coating composition comprising dispersed polyurethane and phyllosilicate. The polyurethane carries acid groups which are at least partially neutralized with a hydrophilic base selected from inorganic bases and organic mono-amines. The hydrophilic base has a water solubility at 20° C. of at least 150 g/l, preferably of at least 200 g/l. The composition can be used for providing oxygen barrier properties to a polymer film.

17 Claims, No Drawings

(51) Int. Cl.

| | | |
|---|---|---|
| C09D 7/40 | (2018.01) | |
| C08G 18/44 | (2006.01) | |
| C08G 18/48 | (2006.01) | |
| C08G 18/56 | (2006.01) | |
| C08G 18/72 | (2006.01) | |
| C08G 18/75 | (2006.01) | |
| C08G 18/76 | (2006.01) | |
| C08K 3/36 | (2006.01) | |
| C08K 5/17 | (2006.01) | |
| C09D 175/06 | (2006.01) | |
| C09D 175/08 | (2006.01) | |
| C09D 175/14 | (2006.01) | |
| C08J 7/043 | (2020.01) | |
| C08J 7/048 | (2020.01) | |
| C08J 7/056 | (2020.01) | |
| C08L 75/04 | (2006.01) | |
| C09D 175/04 | (2006.01) | |
| C08K 3/34 | (2006.01) | |

(52) U.S. Cl.
CPC ............ *C09D 7/70* (2018.01); *C09D 175/04* (2013.01); *C09D 175/06* (2013.01); *C09D 175/08* (2013.01); *C09D 175/14* (2013.01); *C08K 3/346* (2013.01); *C08K 2201/008* (2013.01)

(56) References Cited

U.S. PATENT DOCUMENTS

| | | | |
|---|---|---|---|
| 3,905,929 A | 9/1975 | Noll | |
| 3,920,598 A | 11/1975 | Reiff et al. | |
| 3,954,943 A | 5/1976 | Neumann et al. | |
| 4,431,763 A | 2/1984 | Reed | |
| 5,578,672 A | 11/1996 | Beall et al. | |
| 6,117,932 A | 9/2000 | Hasegawa et al. | |
| 6,197,849 B1 | 3/2001 | Zilg et al. | |
| 6,262,162 B1 | 7/2001 | Lan et al. | |
| 6,569,533 B1 | 5/2003 | Uchida et al. | |
| 6,648,959 B1 | 11/2003 | Fischer et al. | |
| 6,815,489 B1 | 11/2004 | Fischer et al. | |
| 2001/0025076 A1 | 9/2001 | Lan et al. | |
| 2003/0207122 A1 | 11/2003 | Uchida et al. | |
| 2004/0076758 A1* | 4/2004 | Lettmann | C08G 18/12 427/407.1 |
| 2013/0035432 A1* | 2/2013 | Breu | C01B 33/40 524/443 |
| 2014/0212661 A1 | 7/2014 | Khan | |

FOREIGN PATENT DOCUMENTS

| | | | |
|---|---|---|---|
| DE | 1 495 745 | 6/1969 | |
| DE | 1 954 090 | 5/1971 | |
| DE | 2 034 479 | 1/1972 | |
| DE | 39 11 827 A1 | 10/1990 | |
| EP | 0 622 378 A1 | 11/1994 | |
| EP | 1 038 834 A1 | 9/2000 | |
| EP | 1 081 179 A2 | 3/2001 | |
| EP | 2 195 390 A1 | 6/2010 | |
| EP | 2 195 390 B1 | 8/2014 | |
| JP | 2005-139436 A | 6/2005 | |
| JP | 2006-143991 A | 6/2006 | |
| JP | 2006-193657 A | 7/2006 | |
| JP | 2008-284755 A | 11/2008 | |
| JP | 2012-503587 A | 2/2012 | |
| WO | WO 01/04050 A1 | 1/2001 | |
| WO | WO 2010/118948 A1 | 10/2010 | |
| WO | WO 2011/089089 A1 | 7/2011 | |
| WO | WO-2011089089 A1 * | 7/2011 | ............ C09K 21/02 |
| WO | WO 2012/175431 A2 | 12/2012 | |
| WO | WO 2014/164632 A1 | 10/2014 | |
| WO | WO 2014/175277 A1 | 10/2014 | |
| WO | WO 2015/029950 A1 | 3/2015 | |
| WO | WO 2015/163450 A1 | 10/2015 | |

OTHER PUBLICATIONS

PUBChem Ammonium Bicarbonate Water Solubility, downloaded Apr. 24, 2021. (Year: 2021).*

Lin Binyin, "Refractory Material" Metallurgical Industry Press, Oct. 31, 2015, pp. 130-131 (with English Abstract).

International Search Report dated Apr. 3, 2017, in PCT/EP2017/051477 filed Jan. 25, 2017.

Database WPI Week 200653, AN 2006-516852, Abstract, 2006, 2 pages, XP002768320.

Stratigaki, M. et al., "Gas transport properties in waterborne polymer nanocomposite coatings containing organomodified clays", Journal of Coatings Technology and Research. vol. 11, No. 6. 2014, XP055353040, pp. 899-911.

Barboza, E.M. et al., "Avaliação das Propriedades de Barreira de Membranes Obtidas a partir de Dispersões Aguosas à Base de Poliuretanos e Argila", Polimeros Ciencia E Technologia, vol. 24, No. 1, 2014, XP055353050, pp. 94-100.

* cited by examiner

ONE-COMPONENT AQUEOUS COATING COMPOSITIONS CONTAINING POLYURETHANE AND PHYLLOSILICATES FOR OXYGEN BARRIER COATINGS

The invention relates to an aqueous one-component coating composition comprising dispersed polyurethane and phyllosilicate. The polyurethane carries acid groups which are at least partially neutralized with a specific hydrophilic base. The composition can be used for providing oxygen barrier properties to a polymer film.

When products that are susceptible to oxidation or are sensitive to oxygen are packaged it is important that the packaging materials used have gas barrier properties, such as oxygen-barrier properties or water vapor barrier properties, i.e. that they have minimum oxygen and water vapor transmission or minimum oxygen and water vapor permeability. Polymer films used as packaging materials and made e.g. of polyolefins, such as polyethylene, or of oriented polypropylene, or of polyesters, e.g. polyethylene terephthalate, generally have relatively high oxygen permeability when they are used in uncoated form. Various measures have therefore been proposed for increasing the oxygen-barrier properties of these packaging materials.

It was an object of the present invention to provide an easy-to-formulate gas barrier-coating composition. The formulation should be a storage-stable, 1K system which is film-forming at ambient or slightly elevated temperature without the need of adding external crosslinkers and/or the need to cure the coating at elevated temperatures (e.g. ≥80° C.). Addition of external crosslinkers, i.e. formulation of a 2K system results in a limited application window due to pot-life issues. High curing temperatures may interfere with the plastic substrate where the coating is applied onto being too close to its softening point. The resulting coatings should provide excellent barrier against oxygen—even at high relative humidity—as well as against water vapor.

Barrier formulations employing polyurethane emulsion binders and comprising clay as functional filler are principally know but suffer from several drawbacks which make them no solution to the problem outlined above.

Choudalakis and Gotsis (J. Coat. Technol. Res. 2014, 11, 899-911) describe $CO_2$ barrier properties of coatings prepared from waterborne polymers and organomodified clays. Albeit their main focus is an acrylate based binder resin, a polyurethane emulsion (PUD) is also examined alternatively. The PUD is used as a 2K-sysstem because it needs the addition of methylated melamine-formaldehyde resin as external crosslinker and, consequently, needs to be conditioned in a drying oven at baking temperatures of up to 80° C. The reduction in $CO_2$ transmission for this relatively non-demanding permeant is only marginal.

Similarly, Delpech et al. (Polímeros 2014, 24, 94-100) examine the influence of the PUD's polyol backbone on $CO_2$ barrier properties at low clay loadings (≤1 vol. %). The polyurethanes employed in that study are polyether-based and neutralized with triethylamine (TEA, $NEt_3$). As is shown in our own experiments herein, employing a relatively hydrophobic base like $NEt_3$ for neutralization of the polyurethane resin interferes malevolently with the stability of a clay suspension leading to at least partial flocculation. This, in turn, reduces barrier properties of respective coatings dramatically.

WO 2014/175277, WO 2015/029950 and WO 2015/163450 disclose the use of polyurethane emulsions in combination with polyvinyl alcohol as binder resins for barrier coatings; in contrast to the literature cited above, clay loadings are significant (up to 30 wt. %) and oxygen is examined as the permeant. As outlined in the working example of polyurethane resin manufacture, the PU is neutralized with triethylamine (TEA, $NEt_3$), again, which may be detrimental for excellent barrier as stated above. Since polyvinyl alcohol which is well-known to provide good oxygen barrier on its own is used mandatorily as co-resin, the observed barrier properties are likely to stem from the co-resin and a PVOH-free formulation would exhibit inferior barrier. Moreover, the coating compositions are used as 2K compositions containing a polyisocyanate crosslinker (e.g. Takenate WD-725) as important formulation ingredient in the working examples which is in conflict with the request for easy-to-apply coating compositions exhibiting no pot-life issues.

EP 2195390 (SUN Chem.) discloses a multi-component formulation comprising water-soluble silicate combined with a polymer emulsion, inter alia based on polyurethane or a respective hybrid, and clay with water-glass being the main constituent (>70 wt. % of total solids) for the preparation of oxygen barrier coatings on plastic substrates. As shown in Tables 1+2, formulations with polymer emulsions and clay, only, yield no barrier properties at all whereas water-soluble silicate-based formulations do. This finding is substantiated in Table 3 where somewhat more emulsion-rich formulations give inferior OTR values—even at increased clay loading. In conclusion, the use of a polyurethane dispersion as single or substantial binder for barrier coatings based on clay is clearly not recommended. Moreover, according to its material data sheets the Joncryl® U 4188 and Joncryl® U6333 employed in the working examples is neutralized with triethylamine which may be detrimental for excellent barrier properties (see above).

It was an object of the present invention to provide further improved one-component compositions with long pot life and processes which permit production of polymer films with good gas barrier properties, especially against oxygen and water vapor, without the need for crosslinkers and without the need for curing at elevated temperatures.

The invention provides an one-component aqueous coating composition comprising
  (a) at least one dispersed polyurethane, and
  (b) at least one phyllosilicate,
  wherein the polyurethane carries acid groups which are at least partially neutralized with at least one hydrophilic base selected from inorganic bases and organic mono-amines,
  wherein the hydrophilic base has a water solubility at 20° C. of at least 150 g/l, preferably of at least 200 g/l,
  and wherein the coating composition does not contain a crosslinker for the polyurethane.

The invention also provides the use of the aqueous composition for providing oxygen barrier properties, for example to a polymer film.

The invention also provides a polymer film, coated with an aqueous coating composition according to the invention. The invention also provides a coated polymer film comprising an oxygen barrier coating obtainable via the use according to the invention as described herein, wherein at least one side of the polymer film has been coated with the aqueous composition according to the invention.

The oxygen barrier properties can be measured by the permeability test described in the examples. The term oxygen-barrier property means that oxygen transmission rate (OTR) has been reduced in comparison with an uncoated substrate. The oxygen transmission rate of polymer films coated according to the invention is preferably less than 20%, in particular less than 10%, or less than 5%, e.g. from 1 to 3%, of the value for the uncoated polymer film measured at 23° C. and 0% relative humidity; and preferably less than 40% or less than 30% or less than 20% measured at 25° C. and 75% relative humidity.

The invention also provides a package comprising a polymer film according to the invention.

The invention also provides a method of forming a polymeric film with enhanced oxygen barrier properties comprising:

applying an aqueous composition according to the invention to at least one side of a polymer film and drying said composition to form a barrier coating on the polymer film.

The term "one-component composition" describes a composition which is not used in combination with a crosslinking agent which is typically added in the case of so-called two-component compositions shortly before their application on a coating substrate.

The one-component aqueous coating composition preferably contains only very low amount of emulsifier or no emulsifier. The amount of emulsifier is preferably less than 0.8 wt. %, or less than 0.5 wt. %, or less than 0.3 wt. % or less than 0.1 wt. % or 0 wt. %, based on total amounts of solids.

The amount of polyurethane (a) in the aqueous composition is preferably from 10 to 90 wt. % (including the neutralizing base), more preferably from 20 to 90 wt. % and even more preferably from 50 to 85 wt. %, referring to solids content.

The amount of phyllosilicate (b) in the aqueous composition is preferably from 5 to 75 wt. %, more preferably from 5 to 50 wt. % or from 5 to 30 wt. %, most preferred from 10 to 30 wt. %, referring to solids content.

The weight ratio of polyurethane (a) to phyllosilicate (b) is preferably from 95:5 to 50:50, more preferably from 95:5 to 60:40 and even more preferable from 90:10 to 70:30.

The polyurethane is dispersed in aqueous medium. The amount of acid groups of the polyurethane is preferably from 50 mmol/kg to 600 mmol/kg based on dry material. Preferred acid groups are selected from carboxylic acid groups, sulfonic acid groups and phosphoric acid groups.

The polyurethanes are preferably composed of a) polyisocyanates, preferably at least one diisocyanate, b) polyols (compounds with two or more alcoholic hydroxy groups), preferably at least one polyol selected from the group consisting of polyesterdiols, polyetherdiols and polycarbonatediols, and c) optionally further mono- or polyfunctional compounds having reactive groups by way of example selected from alcoholic hydroxy groups, primary amino groups, secondary amino groups, and isocyanate groups, where at least one of the structural components has one or more acid groups.

Examples of suitable organic diisocyanates are those of the formula $X(NCO)_2$, where X is a noncyclic aliphatic hydrocarbon radical having from 4 to 15 carbon atoms, a cycloaliphatic or aromatic hydrocarbon radical having from 6 to 15 carbon atoms, or an araliphatic hydrocarbon radical having from 7 to 15 carbon atoms. Examples of these diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI), e.g. the trans/trans isomer, the cis/cis isomer, and the cis/trans isomer, and also mixtures composed of these compounds. These diisocyanates are available commercially. Particularly important mixtures of these isocyanates are the mixtures of the respective structural isomers of diisocyanatotoluene and diisocyanatodiphenylmethane, and the mixture made of 80 mol % of 2,4-diisocyanatotoluene and 20 mol % of 2,6-diisocyanatotoluene is particularly suitable. The mixtures of aromatic isocyanates, such as 2,4-diisocyanatotoluene and/or 2,6-diisocyanatotoluene, with aliphatic or cycloaliphatic isocyanates, such as hexamethylene diisocyanate or IPDI are also particularly advantageous, the preferred mixing ratio of the aliphatic to aromatic isocyanates being from 1:9 to 9:1, in particular from 1:4 to 4:1.

The structure of the polyurethanes can also use, as polyisocyanate compounds other than the abovementioned compounds, isocyanates which bear not only free isocyanate groups but also capped isocyanate groups, e.g. uretdione groups.

It is preferable that each of the polyurethanes is composed of at least 40% by weight, particularly preferably at least 60% by weight, and very particularly preferably at least 80% by weight, of diisocyanates, polyetherdiols, and/or polyesterdiols and/or polycarbonatediols. It is preferable that the polyurethanes comprise an amount of more than 10% by weight, particularly preferably greater than 30% by weight, in particular greater than 40% by weight or greater than 50% by weight, and very particularly preferably greater than 60% by weight, based on the polyurethane, of polyesterdiols, polyetherdiols or polycarbonatediols, or a mixture thereof.

Polyesterdiols that can be used are mainly relatively high-molecular-weight diols with molar mass from above 500 up to 5000 g/mol, preferably about 1000 to 3000 g/mol. The molar mass of polyetherdiols is preferably from 240 to 5000 g/mol. This is the number-average molar mass Mn. Mn is obtained from determination of the number of end groups (OH number).

Polyesterdiols are known by way of example from Ullmanns Enzyklopädie der technischen Chemie [Ullmann's Encyclopedia of Industrial Chemistry], $4^{th}$ edition, volume 19, pp. 62 to 65. It is preferable to use polyesterdiols which are obtained via reaction of dihydric alcohols with dihydric carboxylic acids. Instead of the free carboxylic acids, it is also possible to use the corresponding polycarboxylic anhydrides or corresponding polycarboxylic esters of lower alcohols, or a mixture of these, to produce the polyester polyols. The polycarboxylic acids can be aliphatic, cycloaliphatic, araliphatic, aromatic, or heterocyclic, and, if appropriate, can have unsaturation and/or substitution, for example by halogen atoms. Examples that may be mentioned of these are: suberic acid, azelaic acid, phthalic acid, isophthalic acid, phthalic anhydride, tetrahydrophthalic anhydride, hexahydrophthalic anhydride, tetrachlorophthalic anhydride, endomethylene-tetrahydrophthalic anhydride, dimeric fatty acids. Preference is given to dicarboxylic acids of the general formula $HOOC-(CH_2)_y-COOH$, where y is a number from 1 to 20, preferably an even number from 2 to 20, examples being succinic acid, adipic acid, sebacic acid, and dodecanedicarboxylic acid.

Examples of dihydric alcohols that can be used for producing the polyesterdiols are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples of these materials are ethylene glycol, butane-1,4-diol, hexane-1,6-diol, octane-1,8-diol, and dodecane-1,12-diol. Preference is further given to neopentyl glycol.

In addition to the polyesterdiols or the polyetherdiols, it is also possible to make use or concomitant use of polycarbonatediols that can by way of example be obtained via reaction of phosgene with an excess of the low-molecular-weight alcohols mentioned as structural components for the polyester polyols. It is also possible, if appropriate, to use lactone-based polyesterdiols, these being homo- or copolymers of lactones, preferably products derived from addition reactions of lactones onto suitable difunctional starter molecules and having terminal hydroxy groups. Lactones that can be used are preferably those deriving from compounds of the general formula HO—$(CH_2)_z$—COOH, where z is a number from 1 to 20, and a hydrogen atom of a methylene unit can also have been substituted by a $C_1$-$C_4$-alkyl radical. Examples are ε-caprolactone, β-propiolactone, γ-butyrolactone, and/or methyl-ε-caprolactone, and also mixtures of these. Examples of suitable starter components are the low-molecular-weight dihydric alcohols mentioned above as structural components for the polyester polyols. Particular preference is given to the corresponding polymers of ε-caprolactone. Lower polyesterdiols or polyetherdiols can also have been used as starters for producing the lactone polymers. Instead of the polymers of lactones, it is also possible to use the corresponding chemically equivalent polycondensates of the hydroxycarboxylic acids that correspond to the lactones.

In a preferred embodiment of the invention, the polyesterdiol used for polyurethane synthesis is (semi-)crystalline yielding a semi-crystalline PUD. Synthesis of semi-crystalline PUDs is described in more detail in WO 2010/118948. Semi-crystalline polymers are polymers which have crystalline regions and a relatively sharp melting point, preferably in the range of −30° C. to +60° C.; in contrast to amorphous polymers, where the polymer chains are oriented randomly, and which might show a glass transition temperature but which have no sharp melting point. Existence of semi-crystalline domains can be detected by performing differential scanning calorimetry (DSC) of the dried polymer, the relative amount of crystallinity can be determined by X-ray diffraction (XRD) or DSC of respective polymer films. Some non-limiting examples of semi-crystalline polyesterols to be used for PUD synthesis are Lupraphen® 6605/1 or 6605/2 from BASF Elastogran, the Dynacoll® 7000 series from Evonik Industries (e.g. Dynacoll® 7360 or 7380) and Priplast® 3192 or 3195 from Croda Coatings & Polymers.

Polyetherdiols can be obtained in particular via homopolymerization of ethylene oxide, propylene oxide, butylene oxide, tetrahydrofuran, styrene oxide, or epichlorohydrin, e.g. in the presence of $BF_3$, or via an addition reaction of these compounds, if appropriate in a mixture or in succession, onto starter components having reactive hydrogen atoms, examples being alcohols or amines, e.g. water, ethylene glycol, propane-1,2-diol, propane-1,3-diol, 2,2-bis(4-hydroxyphenyl)propane, or aniline. Particular preference is given to propylene oxide, and to polytetrahydrofuran of number-average molecular weight from 240 to 5000, and especially from 500 to 4500. Preference is given to polyetherdiols composed of less than 20% by weight of ethylene oxide.

It is also possible to make concomitant use of polyhydroxyolefins, preferably those having 2 terminal hydroxyl groups, e.g. α,ω-dihydroxypolybutadiene, α,ω-dihydroxypolymethacrylic ester, or α,ω-dihydroxypolyacrylic ester, as monomers (c1). These compounds are known by way of example from EP-A 622 378. Other suitable polyols are polyacetals, polysiloxanes, and alkyd resins.

The polyetherdiols have preferably been selected from polytetrahydrofuran and polypropylene oxide. The polyesterdiols have preferably been selected from reaction products of dihydric alcohols with dibasic carboxylic acids and lactone-based polyesterdiols.

The hardness and modulus of elasticity of the polyurethanes can, if necessary, be increased if the diols used comprise not only the polyesterdiols and, respectively, the polyetherdiols but also low-molecular-weight monomeric diols which differ therefrom with molar mass of about 60 to 500 g/mol, preferably 62 to 200 g/mol. Low-molecular-weight monomeric diols used are especially the structural components of the short-chain alkanediols mentioned for the production of polyester polyols, preference being given here to the unbranched diols having from 2 to 12 carbon atoms and having an even number of carbon atoms, and also to pentane-1,5-diol and neopentyl glycol. Examples are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes, such as 1,4-bis(hydroxymethyl)cyclohexane, 2-methylpropane-1,3-diol, and methylpentanediols, and other compounds that can be used are diethylene glycol, triethylene glycol, tetraethylene glycol, polyethylene glycol, dipropylene glycol, polypropylene glycol, dibutylene glycol, and polybutylene glycols. Preference is given to alcohols of the general formula HO—$(CH_2)_x$—OH, where x is a number from 1 to 20, preferably an even number from 2 to 20. Examples here are ethylene glycol, butane-1,4-diol, hexane-1,6-diol, octane-1,8-diol, and dodecane-1,12-diol. Preference is further given to neopentyl glycol. The proportion of the polyesterdiols and, respectively, of the polyetherdiols, based on the total amount of all of the diols, is preferably from 10 to 100 mol %, and the proportion of the low-molecular-weight, monomeric diols, based on the total amount of all of the diols, is preferably form 0 to 90 mol %. It is particularly preferable that the molar ratio of the polymeric diols to the monomeric diols is from 0.1:1 to 5:1, particularly from 0.2:1 to 2:1.

In order to achieve water-dispersibility of the polyurethanes, the polyurethanes can also comprise, as structural component, monomers which bear at least one isocyanate group or which bear at least one group reactive toward isocyanate groups and which moreover bear at least one hydrophilic group or one group which can be converted into a hydrophilic group. In the text below, the expression "hydrophilic groups or potentially hydrophilic groups" is abbreviated to "(potentially) hydrophilic groups". The (potentially) hydrophilic groups react with isocyanates substantially more slowly than the functional groups of the monomers which serve for the structure of the main polymer chain. The proportion of components having (potentially) hydrophilic groups, based on the total amount of all of the structural components of the polyurethanes, is generally judged in such a way that the molar amount of the (potentially) hydrophilic groups, based on the total weight of all of the monomers, is from 30 to 1000 mmol/kg, preferably from 50 to 500 mmol/kg, and particularly preferably from 80 to 300 mmol/kg. The (potentially) hydrophilic groups can be nonionic or preferably (potentially) ionic hydrophilic groups. Particular nonionic hydrophilic groups that can be used are polyethylene glycol ethers preferably made of from 5 to 100, with preference from 10 to 80, repeat units of ethylene oxide. The content of polyethylene oxide units is generally form 0 to 10% by weight, preferably from 0 to 6% by weight, based on the total amount of all of the monomers. Preferred monomers having nonionic hydrophilic groups are polyethylene oxide diols having at least 20% by weight of ethylene oxide, polyethylene oxide monools, and also the reaction products of a polyethylene glycol and of a diisocyanate, where these bear a terminally etherified polyethylene glycol radical. Patent specifications U.S. Pat. Nos. 3,905,929 and 3,920,598 cite diisocyanates of this type and processes for producing the same.

The alternative use of ionic or non-ionic emulsifiers like sodium dodecyl-sulfate (SDS), sodium dodecylbenzenesulfonate (LDBS) or fatty alcohol ethoxylates (e.g. Lutensol® AT 18) in order to achieve water-dispersibility of the polyurethanes is less preferred since emulsifiers are literature-known for their tendency to phase-separate and/or migrate after film formation leading to bad intercoat adhesion and/or delamination phenomena. Thus, the inventive polyurethane dispersions preferably comprise less than 1.0 wt. %, more preferably less than 0.5 wt. % of emulsifiers based on total amounts of solids. Most preferably, they are essentially emulsifier free, i.e. they have no emulsifier added.

The polyurethanes comprise monomers having acid groups as structural components. Acid groups are especially the sulfonic acid group, the carboxylic acid group, and the phosphoric acid group, which can be converted to the form of their salts by suitable bases, e.g. to their alkali-metal salts or their ammonium salts. Acid monomers are described in detail by way of example in Ullmanns Enzyklopadie der technischen Chemie [Ullmann's Encyclopedia of Industrial Chemistry], 4$^{th}$ edition, volume 19, S.311-313, and by way of example in DE-A 1 495 745.

Monomers that can be used having acid groups are usually aliphatic, cycloaliphatic, araliphatic, or aromatic carboxylic acids and sulfonic acids which bear at least one alcoholic hydroxy group or which bear at least one primary or secondary amino group. Preference is given to the dihydroxyalkylcarboxylic acids, especially those having from 3 to 10 carbon atoms, also described in U.S. Pat. No. 3,412,054. Compounds of the general formula (c1)

(c1)

in which $R^1$ and $R^2$ are a $C_1$-$C_4$-alkanediyl unit and $R^3$ is a $C_1$-$C_4$-alkyl unit are particularly preferred, especially dimethylolpropionic acid (DMPA). Other suitable compounds are corresponding dihydroxysulfonic acids and dihydroxyphosphonic acids, such as 2,3-dihydroxypropane phosphonic acid. Other suitable compounds are dihydroxy compounds with molar mass from above 500 to 10 000 g/mol having at least two carboxylate groups and disclosed in DE-A 39 11 827. They are obtainable via reaction of dihydroxy compounds with tetracarboxylic dianhydrides, such as pyromellitic dianhydride or cyclopentanetetracarboxylic dianhydride, in a molar ratio of from 2:1 to 1.05:1, in a polyaddition reaction. Particularly suitable dihydroxy compounds are the monomers listed as chain extenders, and also the abovementioned diols.

Particularly preferred acid structural components have carboxy groups. The carboxy groups can be introduced into the polyurethanes by way of the abovementioned aliphatic, cycloaliphatic, araliphatic, or aromatic carboxylic acids which bear at least one alcoholic hydroxy group or which bear at least one primary or secondary amino group. Preference is given to dihydroxyalkylcarboxylic acids, especially having from 3 to 10 carbon atoms, particularly dimethylolpropionic acid. One particularly preferred structural component for acid polyurethanes is 2,2-bis(hydroxymethyl)propionic acid (dimethylolpropionic acid, DMPA).

Other anionic structural components that can be used, having amino groups reactive toward isocyanates, are aminocarboxylic acids, such as lysine or β-alanine, or the adducts mentioned in DE-A 20 34 479 of aliphatic diprimary diamines with alpha,beta-unsaturated carboxylic or sulfonic acids. These compounds comply by way of example with the formula (c2)

(c2)

in which $R^4$ and $R^5$, independently of one another, are a $C_1$-$C_6$-alkanediyl unit, preferably ethylene, and X is COOH or SO$_3$H. Particularly preferred compounds of the formula (c2) are N-(2-aminoethyl)-2-aminoethanecarboxylic acid, and also N-(2-aminoethyl)-2-aminoethanesulfonic acid and the corresponding alkali-metal salts, particular preference being given here to Na as counterion. Particular preference is further given to the adducts of the abovementioned aliphatic diprimary amines with 2-acrylamido-2-methylpropanesulfonic acid, for example those described in DE-B 1 954 090.

The acid groups are at least partially or completely neutralized. The degree of neutralization is preferably from 30 to 100 mol %, more preferably from 50 to 100%, based on the total molar amount of acid groups of the polyurethane.

Neutralization can be made prior to or during, but preferably after, the isocyanate-polyaddition reaction, since the ionic monomers are often only sparingly soluble in the reaction mixture. The neutralizing hydrophilic base has a water solubility at 20° C. of at least 150 g/l, preferably of at least 200 g/l. The hydrophilic base is preferably selected from inorganic metal salts and ammonia. Suitable bases are for example alkali hydroxides or alkaline earth metal hydroxides such as sodium hydroxide, potassium hydroxide, lithium hydroxide, calcium hydroxide, barium hydroxide, or sodium carbonate, potassium carbonate, trisodium phosphate. Organic mono-amine bases are organic compounds with a single amine group. The amine group can be a primary, secondary or tertiary amine group. Suitable organic amines are for example diethylethanolamine and dimethylethanolamine. Preferred examples of neutralizing agents (water solubility values at 20° C.) are ammonia (solubility 541 g/l), NaOH (solubility 1090 g/l), diethylethanolamine (DEEA, miscible with water), dimethylethanolamine (DMEA, solubility 228 g/l). Hydrophobic bases which are characterized by a water solubility at 20° C. below 150 g/l like triethylamine (TEA, NEt$_3$; solubility 130 g/l) have surprisingly be found to malevolently interfere with the phyllosilicate filler and are, thus, outside the scope of this invention.

Further, polyfunctional monomers can be used for the crosslinking or chain-extension of the polyurethanes. These are generally more than dihydric non-phenolic alcohols, amines having 2 or more primary and/or secondary amino groups, or else compounds which bear not only one or more alcoholic hydroxy groups but also one or more primary and/or secondary amino groups. Examples of alcohols having functionality higher than 2 which can be used to adjust to a particular degree of branching or crosslinking are trimethylolpropane, glycerol, or sugars. It is also possible to use polyamines having 2 or more primary and/or secondary amino groups, and monoalcohols, where these bear, in addition to the hydroxy group, a further group reactive toward isocyanates, examples being monoalcohols having one or more primary and/or secondary amino groups, e.g. monoethanolamine. The polyurethanes preferably comprise from 1 to 30 mol %, particularly preferably from 4 to 25 mol %, based on the total amount of all of the structural components, of a polyamine having at least two amino groups reactive toward isocyanates. It is also possible to use isocyanates of functionality greater than 2 for the same purpose. Examples of commercially available compounds are the isocyanurate or the biuret of hexamethylene diisocyanate.

Monofunctional monomers which are used optionally are monoisocyanates, monoalcohols, and monoprimary and -secondary amines. Their proportion is generally at most 10 mol %, based on the total molar amount of the monomers. These monofunctional compounds usually bear further functional groups, e.g. olefinic groups or carbonyl groups, and are used to introduce, into the polyurethane, functional groups which permit dispersion or, respectively, crosslinking or further polymer-analogous reaction of the polyurethane. Monomers that can be used for this are isopropenyl-$\alpha,\alpha$-dimethylbenzyl isocyanate (TMI) and esters of acrylic or methacrylic acid, e.g. hydroxyethyl acrylate or hydroxyethyl methacrylate.

The method for adjusting the molecular weight of the polyurethanes via selection of the proportions of the monomers that can react with one another, and selection of the arithmetic average of the number of reactive functional groups per molecule, is well known in the field of polyurethane chemistry. The components and their respective molar amounts are normally selected in such a way that the ratio A:B, where A is the molar amount of isocyanate groups, and B is the total of the molar amount of the hydroxy groups and the molar amount of the functional groups that can react with isocyanates in an addition reaction, is from 0.5:1 to 2:1, preferably from 0.8:1 to 1.5:1, particularly preferably from 0.9:1 to 1.2:1. It is very particularly preferable that the ratio A:B is as close as possible to 1:1. The monomers usually bear an average of from 1.5 to 2.5, preferably from 1.9 to 2.1, particularly preferably 2.0, isocyanate groups and, respectively, functional groups which can react with isocyanates in an addition reaction.

The polyaddition reaction of the structural components to produce the polyurethane preferably takes place at reaction temperatures of up to 180° C., preferably up to 150° C., at atmospheric pressure or under autogenous pressure. The production of polyurethanes and of aqueous polyurethane dispersions is known to the person skilled in the art.

The polyurethane is preferably composed of
a) diisocyanates, preferably selected from diisocyanates of the formula $X(NCO)_2$, where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms,
b) at least one dihydroxy compound selected from polyester diols and polyether diols, preferably polyesterdiols with molar mass of greater than 500 to 5000 g/mol, and/or polyetherdiols with molar mass of from 240 to 5000 g/mol,
c) at least one compound having at least one group reactive toward isocyanate groups, and additionally carrying at least one acid group, preferably diols having carboxylic acid groups, and
d) optionally further mono- or polyfunctional compounds which differ from a)-c) and have reactive groups, preferably selected from alcoholic hydroxy groups, primary amino groups, secondary amino groups, and isocyanate groups.

Most preferably, the polyurethane is semi-crystalline, in particular polyester-based and semi-crystalline.

The aqueous coating composition does not contain a crosslinker, especially no melamine, melamine formaldehyde, polyamine or isocyanate crosslinker.

The aqueous composition contains at least one phyllosilicate. Phyllosilicates are a subgroup of silicate minerals. Phyllosilicates are sheet silicate materials (layered silicates), formed by parallel sheets of silicate tetrahedra with $Si_2O_5$ or a 2:5 ratio. The tetrahedral layers alternate with octahedron layers. In the octahedral layers are cations surrounded by hydroxide ions and/or oxygen in octahedral coordination. The actual layers themselves are usually charged negatively and the charges are partially offset by additional cations in the interstices of the respective layers. These additional cations are to be distinguished from the foregoing cations in the octahedral layers. Many phyllosilicates may be well swollen in water and/or dispersed. This process is called exfoliation (or synonymously delamination).

The phyllosilicate may be natural or synthetic. They have an aspect ratio of preferably at least 50, more preferably more than 400, or more than 1000 and most preferably more than 10000. The mode of barrier action of phyllosilicates is due to their high aspect ratio (ratio of width to thickness). The starting clay materials are layered structures which can be exfoliation and delaminated in a known manner which— in an idealized case—leads to individual platelets with thicknesses of preferably greater or equal 10 nm, ideally about 1 nm corresponding to a single clay layer.

The layer charge is preferably from 0.01 to 2.0 per formula unit, preferably from 0.3 to 0.95 and ideally from 0.4 to 0.6.

The phyllosilicates may be modified or unmodified. Preference is given to modified phyllosilicates.

The phyllosilicates may be selected from montmorillonite, bentonite, kaolinite, mica, hectorite, fluorohectorite, saponite, beidellite, nontronite, stevensite, vermiculite, fluorovermiculite, halloysite, volkonskoite, suconite, magadite, sauconite, stibensite, stipulgites, attapulgites, illites, kenyaite, smectite, allevardite, muscovite, palygorskite, sepiolite, silinait, grumantite, revdite, zeolites, fuller's earth, natural or synthetic talc and mica, or of synthetic origin, such as permutites. Most preferred are exfoliated, organically modified smectites.

These phyllosilicates are composed of packets of face to face stacking of individual silicate layers or sheets. The thickness of the sheets is typically about 1 nm and the longest length of the sheets is typically from 50 to 1000 nm or even longer, resulting in aspect ratios of 50 to 1000. As described by Breu et al. (Nanoscale 2012, 4, 5633-5639), aspect ratios of more than 10000 can be realized for synthetic clays.

Preferred are montmorillonite (aluminium magnesium silicate), hectorite (magnesium lithium silicate) clays, with synthetic fluorohectorite being the most preferred. Also preferred are exfoliated smectite types.

Preferred synthetic phyllosilicates are synthetic smectites. Preferred synthetic smectites are those of the formula

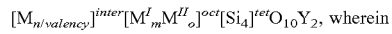
$[M_{n/valency}]^{inter}[M^I_m M^{II}_o]^{oct}[Si_4]^{tet}O_{10}Y_2$, wherein M are metal cations of oxidation state 1 to 3, or H+,
$M^I$ metal cations of oxidation state 2 or 3,
$M^{II}$ are metal cations of oxidation state 1 or 2,
X are di-anions and
Y are mono-anions,
m for metal atoms $M^I$ of oxidation state 3 is ≤2.0
and m for metal atoms $M^I$ of oxidation state 2 is ≤3.0,
o is ≤1.0 and
the layer charge n is from 0.01 to 2.0, preferably from 0.3 to 0.95 and ideally from 0.4 to 0.6.

M preferably has oxidation state 1 or 2. M is particularly preferably Li+, Na+, Mg$^{2+}$, or a mixture of two or more of those ions. M is most particularly preferably Na+ or Li+.

$M^I$ is preferably Mg$^{2+}$, Al$^{3+}$, Zn$^{2+}$, Fe$^{2+}$, Fe$^{3+}$ or a mixture of two or more of those ions.

$M^{II}$ is preferably Li+, Mg$^{2+}$ or a mixture of those cations.

Y is preferably OH$^-$ or F$^-$, particularly preferably F$^-$.

According to a particularly preferred embodiment of the invention, M is Li+, Na+, H+ or a mixture of two or more of those ions, $M^I$ is Mg$^{2+}$, $M^{II}$ is Li+, and Y is F$^-$.

A synthesis procedure of suitable synthetic layered silicates is described in M. Stoter et al., Langmuir 2013, 29, 1280-1285. A method for producing suitable and preferred phyllosilicates having high aspect ratios is described in WO 2011/089089. Synthetic phyllosilicates may be prepared by high-temperature melt synthesis, followed by exfoliation and/or delamination to give phyllosilicate platelets having a high aspect ratio, e.g. as described in WO 2011/089089 or in WO 2012/175431. By means of this process it is possible to obtain phyllosilicate platelets having an average aspect ratio greater than 400. A further advantage of the phyllosilicate platelets obtainable by this process is that, unlike natural montmorillonites and vermiculites, which are more or less yellowish-brown in colour, they are colourless. This allows colourless composite materials to be produced therefrom.

Suitable phyllosilicates may also be produced hydrothermally, for example hydrothermally produced smectite such as Optigel® SH. It is well known to produce hectorite synthetically via hydrothermal processing. For example, U.S. Pat. Nos. 3,954,943 and 3,586,478 teach the synthesis of fluorine containing hectorite by a hydrothermal process. WO 2014/164632 teaches suitable synthetic zinc hectorite via hydrothermal preparation.

Preferably, the phyllosilicates are surface-modified with at least one organic compound having at least one group selected from amino groups and ammonium groups. Different type of cationic modification can be used to replace metal cations (e.g. sodium cations) from the surface of the delaminated phyllosilicates. The surface modification can provide stabilization of the delaminated or exfoliated phyllosilicates and compatibilization with polymers (a) and (b).

Cationic modification means that an organic moiety has been strongly attached to the phyllosilicate by a treatment of subjecting the phyllosilicate to an ion exchange process whereby inorganic cations present in the phyllosilicate are replaced by organic cations comprising, but not limited to, either an organic group bonded to a cationic salt group, such as quaternary ammonium, phosphonium, pyridinium or the like, or an organic compound containing a cationic amine salt.

The phyllosilicates are made organophilic by ion-exchanging organic or polymeric molecules between the inorganic layers, e.g. according to a process as described in U.S. Pat. No. 5,578,672. By way of example, mention may be made of the organophilic clays described in U.S. Pat. No. 6,117,932. Preferably, the clay is modified with an organic substance by ionic bonding with an onium ion having preferably 4 carbon atoms or more. If the number of carbon atoms is less than 4, the organic onium ion might be too hydrophilic and therefore the compatibility with the polymer matrix may decrease. By way of example of organic onium ion, mention may be made of hexylammonium ions, octylammonium ions, 2-ethylhexylammonium ions, dodecylammonium ions, laurylammonium ions, octadecylammonium (stearylammonium) ions, dioctyldimethylammonium ions, trioctylammonium ions, distearyldimethylammonium ions, stearyltrimethylammonium ions and ammonium laurate ions. It is recommended to use a clay having the highest possible surface of contact with the polymer.

Other examples of organic onium ions or their precursors used for cationic modification may be selected from amino acids like glycine, alanine, lysine, ornithine or their derivatives; e.g. L-lysine monohydrochloride or N,N,N-trimethylglycine hydrochloride (=betaine); from amino alcohols like ethanol amine, N,N'-dimethyl ethanolamine, N,N'-dimethylamino ethoxyethanol, diethanol amine, triethanolamine, 2-amino-2-(hydroxymethyl)-1,3-propandiol (=TRIS); or from alkoxylated amines or amides like ethoxylated ethylene diamine (e.g. Mazeen® 184, Tetronic® 90R4, Tetronic®904 or Tetronic® 1107), ethoxylated fatty amines (e.g. Lutensol® FA 12, Lutensol® FA 12K), ethoxylated fatty acid amides (e.g. Lutensol® FSA 10) or polyether amines like Jeffamine® M-600, M-1000, M-2005 or M-2070 from the Jeffamine® M-series or Polyamine D-230, D-400, D-2000, T-403 or T-5000 from BASF. Preferred modifiers are betaine, TRIS, lysine, alkoxylated ethylene diamines or ethoxylated fatty amines.

The cationic exchange capacity of the phyllosilicates is preferably from 50 and 200 milliequivalents per 100 g. The proportion of organic onium ion is advantageously from 0.3 to 3, preferably from 0.3 to 2 equivalents of the ion exchange capacity of the clay.

One embodiment of the invention is a polymer film coated with an aqueous composition as described above, in particular a polymer film comprising an oxygen barrier coating obtainable via the use of an aqueous composition as described above, wherein at least one side of the polymer film has been coated with an aqueous composition comprising (a) at least one dispersed polyurethane, and
(b) at least one phyllosilicate, wherein the polyurethane carries acid groups which are at least partially neutralized with at least one hydrophilic base selected from inorganic bases and organic mono-amines, wherein the hydrophilic base has a water solubility at 20° C. of at least 150 g/l, preferably of at least 200 g/l, and wherein the coating composition does not contain a crosslinker for the polyurethane.

The oxygen transmission rate of the coated film is preferably less than 40% of the oxygen transmission rate of the uncoated film, measured at 25° C. and 75% relative humidity.

The aqueous composition used for the coating process can comprise further additives or auxiliaries, e.g. thickeners for adjusting rheology, wetting aids, or binders. Preferred polymer film substrates are polymer films which are suitable for packaging.

Preferred polymer films are made of oriented polypropylene or polyethylene, where the polyethylene can be produced from ethylene either by the high-pressure polymerization process or by the low-pressure polymerization process. Examples of other suitable polymer films are made of polyester, such as polyethylene terephthalate, and films made of polyamide, polystyrene and polyvinyl chloride. In one embodiment, the polymer film is biodegradable, e.g. made of biodegradable aliphatic-aromatic copolyesters and/or polylactic acid, an example being Ecoflex® films or Ecovio® films. Examples of suitable copolyesters are those formed from alkanediols, in particular C2 to C8 alkanediols, e.g. 1,4-butanediol, and from aliphatic dicarboxylic acids, in particular C2 to C8 dicarboxylic acids, e.g. adipic acid, and from aromatic dicarboxylic acids, e.g. terephthalic acid. Preferred polymer film materials are selected from polyethylene terephthalate, oriented polypropylene, casted polypropylene, polyethylene, biodegradable aliphatic-aromatic copolyesters, metalized polyethylene terephthalate, metalized oriented polypropylene and polyamide.

The thickness of the polymer film can be in the range from 5 to 200 µm, in the case of films made of polyamide from 5 to 50 µm, in the case of films made of polyethylene terephthalate from 10 to 100 µm, in case of oriented polypropylene form 10 to 100 µm, in the case of films of polyvinyl chloride about 100 µm, and in the case of films made of polystyrene about 30-75 µm.

Preferably, the oxygen barrier coating on the polymer film is pore-free, which can be analyzed by atomic force microscopy (AFM) or scanning electron microscope (SEM).

One object of the invention is a method of forming a polymeric film with enhanced oxygen barrier properties comprising:
applying an aqueous composition according to the invention as described above to at least one side of the polymer film, and
drying said composition to form a barrier coating on the polymer film.

The aqueous composition can be applied by typical coating machinery to a backing film made of a plastic. If materials in the form of webs are used, the aqueous composition is usually applied from a trough by way of an applicator roll and rendered uniform with the aid of an air knife. Other suitable possibilities for applying the coating use the reverse gravure process, or spray processes, or a spreader system that uses a roll, or other coating processes known to the person skilled in the art. The aqueous composition can also be applied in a multi-coating process, wherein a first coating is followed by a second or more coating.

Other suitable coating processes are the known intaglio printing and relief printing processes. Instead of using different inks in the printing-ink units, the process here by way of example uses a printing process for application of the aqueous polymer solution. Printing processes that may be mentioned are the flexographic printing process as a relief printing process known to the person skilled in the art, the gravure process as an example of intaglio printing, and offset printing as an example of flatbed printing. Modern digital printing, inkjet printing, electrophotography and direct imaging can also be used.

In order to achieve a further improvement in adhesion on a polymer film, the backing film can be previously subjected to corona treatment. Examples of the amounts applied to the sheet materials are preferably from 0.2 to 50 g (polymer, solid) per m$^2$, preferably from 0.5 to 20 g/m$^2$ or from 1 to 15 g/m$^2$.

In order to achieve a further improvement in adhesion on a polymer film, a pre-coating or a primer can be applied on the polymer film before coating the oxygen barrier onto the substrate. Such primers can be based on polyurethane dispersions, polyurethane solutions, solvent-free or solvent based reactive polyurethane, polyethylene imine, polyacrylates or other primers known to the person skilled in the art.

Once the aqueous coating composition has been applied to the sheet substrates, the solvent/water is evaporated. For this, by way of example, in the case of continuous operation, the material can be passed through a drying tunnel, which can have an infrared irradiation apparatus. The coated and dried material is then passed over a cooling roll and finally wound up. The thickness of the dried coating is preferably from 0.2 to 50 µm, particularly preferably from 0.5 to 20 µm, most preferred from 0.7 to 5 µm.

The substrates coated with the aqueous coating composition exhibit excellent oxygen-barrier action, in particular in high humidity environments. The coated substrates can be used for example as means of packaging, preferably for packaging foods. The coatings have very good mechanical properties and exhibit, for example, an extraordinary flexibility.

The oxygen barrier coating can also be used as a barrier coating against other substances. Such substances can be carbon dioxide, nitrogen, bisphenol A (BPA), mineral oil, fat, aldehydes, grease, plasticizer, photoinitiators or aroma substances.

In order to obtain specific additional surface properties or specific coating properties of the coated polymer films, for example good printability, or further improved sealing and non-blocking properties, or good water-resistance, it can be advantageous to overcoat the coated substrates with topcoat layers which provide these desired additional properties. The substrates precoated with the aqueous coating composition according to the invention can readily be overcoated. For the overcoating process, one of the processes mentioned above can be repeated, or repeated coating can be carried out in a continuous process without any intervening wind-up and unwind of the foil. The location of the oxygen barrier layer can thus be in the interior of the system, and the surface properties are then determined by the topcoat layer. The topcoat layer has good adhesion to the oxygen-barrier layer. Due to the good humidity resistance, it is in particular not necessary to apply an additional moisture-protection coating to ensure that the oxygen-barrier layer is effective even at relatively high humidity levels.

In one embodiment, a polymer film of the invention comprises in addition to the oxygen barrier coating at least one additional layer made from materials selected from the group consisting of polyacrylates, polyvinylidene chloride (PVDC), waxes, epoxy resins, UV curable acrylates and polyurethanes.

In one embodiment of the invention a polymer film of the invention as described above is laminated with at least one additional material wherein the at least one additional material is selected from polyethylene terephthalate, oriented polypropylene, polyethylene, casted polypropylene, biodegradable aliphatic-aromatic copolyesters, metalized polyethylene terephthalate, metalized oriented polypropylene, polyamide, paper and board.

Another object of the invention is a package comprising a polymer film according to the invention as described above.

Another object of the invention is the use of an aqueous composition according to the invention as described above for providing oxygen barrier properties.

EXAMPLES

Measurement of Oxygen-Barrier Action:

Oxygen transmission rate (OTR) is determined on coatings on polymer films at a relative humidity (RH) level of 75% and at a temperature of 25° C.

Measurements are done with synthetic air (21% oxygen; results are extrapolated for 100% oxygen.

Carrier material: polymer film of PET (polyethylene terephthalate) from Bleher Folientechnik with a thickness of 36 μm, one side corona treated.

OTR of the uncoated film: 33 cm$^3$ m$^{-2}$ day$^{-1}$ bar$^{-1}$.

The determination method is based on ASTM D3985-05, using a coulometric sensor. Each sample is measured twice and the mean result is calculated.

OTR are obtained on a Mocon OX-TRAN 2/21 XL instrument with a lower detection limit of 0.0005 cm$^3$ m$^{-2}$ day$^{-1}$ bar$^{-1}$.

Water vapour transmission rates (WVTR) were measured on a Mocon PERMATRAN-W model 333 at 25° C. and a relative humidity of 75% RH. The lower detection limit of the device was 0.05 g m$^{-2}$ day$^{-1}$.

Polyurethane dispersion (PUD) samples:
PUD-A: Astacin® Finish PUM; amorphous PUD stabilized by acid groups neutralized with NaOH, emulsifier free; 37% solids content, commercially available from BASF SE (Ludwigshafen, Germany)
PUD-B: Emuldur® 360 A; amorphous PUD stabilized by acid groups neutralized with NaOH, emulsifier free; 40% solids content, commercially available from BASF SE (Ludwigshafen, Germany)
PUD-C: Luphen® 585; semi-crystalline PUD stabilized by acid groups neutralized with NaOH, emulsifier free; 40% solids content, commercially available from BASF SE (Ludwigshafen, Germany)
PUD-D: Luphen® D 207 E; semi-crystalline PUD stabilized by acid groups neutralized with NaOH, emulsifier free; 45% solids content, commercially available from BASF SE (Ludwigshafen, Germany)
PUD-E: Luphen® DDS 3577; amorphous PUD stabilized by acid groups, neutralized with NH$_3$, emulsifier free; 40% solids content, commercially available from BASF SE (Ludwigshafen, Germany)
PUD-F: Epotal® FLX 3621; amorphous PUD stabilized by acid groups neutralized with NaOH, emulsifier free; 53% solids content, commercially available from BASF SE (Ludwigshafen, Germany)
PUD-G: Astacin® Grund UH; amorphous PUD stabilized by acid groups (comparative) neutralized with triethylamine (TEA; NEt$_3$), emulsifier free; 20% solids content, commercially available from BASF SE (Ludwigshafen, Germany)

Phyllosilicates:
Na-hect synthetic sodium fluorohectorite
L-hect hectorite modified with L-lysine Modification Agents:
L-lysine: (S)-2,6-Diaminohexanoic acid monohydrochloride C$_6$H$_{14}$N$_2$O$_2$.HCl, reagent grade ≥98%, Sigma-Aldrich GmbH, Germany.

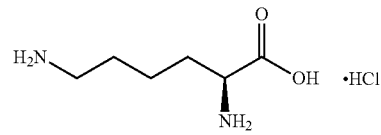

The type of phyllosilicate used in the examples is exfoliated smectite type with layer charge of 0.5 per formula unit (p.f.u.). The synthesis procedure of the used phyllosilicate is described in M. Stoter, D. A. Kunz, M. Schmidt, D. Hirsemann, H. Kalo, B. Putz, J. Senker, J. Breu, Langmuir 2013, 29, 1280-1285. The phyllosilicate is a synthetic sodium fluorohectorite (Na-hect) and has a cation exchange capacity of 127 meq/100 g. The chemical formula is:

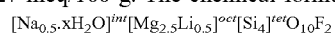

Modification of the Sodium Fluorohectorite:

Cationic modification was used to replace sodium cations from the surface of the delaminated layered silicate. Modification provides stabilization of the delaminated layered silicates and compatibilization of the layered silicate with the polymer matrix within the suspension and in the drying step of film-formation.

Example 1: Modification of Delaminated Na-Hect (L-Hect)

In a 50 ml centrifuge tube 0.25 g of Na-hect was suspended in 30 ml of distillate water. For the surface modification of the Na-hect a 125% of CEC (cation exchange capacity) of the modification agent L-Lysin (dissolved in 5 ml distillate water) was added and placed into an overhead shaker for 12 h. Afterward the modified Na-hect was centrifuged at 10000 rpm, the separated supernatant was discarded and the modified Na-hect was re-suspended in distillate water and again a 125% of CEC of the modification agent L-Lysin (dissolved in 5 ml distillate water) was added and placed into an overhead shaker for 12 h to ensure complete surface modification of Na-hect. Again the modified Na-hect was centrifuged at 10000 rpm and the separated supernatant was discarded and the resulting, completely modified clay (=L-hect) was washed with distilled water washed until the conductivity of the separated supernatant was below 25 μs.

Example 2: Manufacture of Coating Formulation by Suspension of L-Hect in Polyurethane Emulsion PUD-A and Preparation of Barrier Films Under stirring, the lysine-modified clay (L-hect) synthesized in Example 1 was added to the required amount of polyurethane PUD-A to produce a suspension with 20 wt. % (based on inorganic material, i.e. without modification agent) of phyllosilicate in the final solid material (the amount of modification agent was calculated on the side of polymer). The final solids content was adjusted to 2.5 wt. % by addition of respective amounts of distilled water yielding a ready-to-use formulation which was applied on the corona-treated side of a pre-heated PET substrate (70° C.) via doctor-blading (18 mm/s, 60 μm slit width). The resulting coating film was dried first at ambient conditions, then at 80° C. for 48 h and had a dry-film thickness of approx. 1.6 μm. Subsequently, the coating was analyzed for its barrier properties, i.e. OTR and WVTR; results are listed in Table 1.

Examples 3, 4a, 5a, 6-7: Manufacture of Coating Formulations by Suspension of L-Hect in Polyurethane Emulsions PUD-B to -F and Preparation of Barrier Films The general procedure outlined in Example 2 was followed employing polyurethane emulsions PUD-B to -F.

Example 4b: Manufacture of Coating Formulation by Suspension of Unmodified Phyllosilicate Na-hect in Polyurethane Emulsion PUD-C and Preparation of Barrier Films Employing polyurethane emulsion PUD-C, the general procedure outlined in Example 2 was followed with the exemption that instead of the lysine-modified clay (=L-hect) its unmodified precursor Na-hect was used as barrier filler.

Example 5b: Manufacture of Coating Formulation by Suspension of Higher Amounts of Modified Phyllosilicate Na-Hect in Polyurethane Emulsion PUD-D and Preparation of Barrier Films Employing polyurethane emulsion D, the general procedure outlined in Example 2 was followed with the exemption that the amount of lysine-modified clay (=L-hect) synthesized in Example 1 was increased to produce a suspension with 50 wt. % (based on inorganic material, i.e. without modification agent)) of phyllosilicate in the final solid material.

Comparative Example C8a: Manufacture of Coating Formulation by Suspension of L-Hect in Polyurethane Emulsion PUD-G, Neutralization with Triethylamine Following the general procedure outlined in Example 2, preparation of a stable coatings formulation based on PUD-G was not possible leading to gelation/flocculation. In further experiments it could be confirmed that the triethylamine used for neutralization of polyurethane PUD-G interferes malevolently with the lysine-modified clay making it too hydrophobic for being compatible with a water-borne system.

Comparative Examples C2-C8: Barrier Films Based on Clay-Free Polyurethane Emulsions The as-received polyurethane emulsions PUD-A to G were diluted with distilled water to such an extent that respective drawdowns via doctor-blading (18 mm/s, 60 μm slit width) yielded a dry-film thickness comparable to Examples 2-8 (approx 1.6 μm).

The best barrier properties are achieved with semi-crystalline polyurethane dispersions PUD-C and PUD-D.

The invention claimed is:

1. A one-component aqueous coating composition, comprising:
    (a) at least one dispersed polyurethane in a range of 10 to 90 wt. % with respect to a solids content of the one-component aqueous coating composition; and
    (b) at least one phyllosilicate in a range of 5 to 75 wt. % with respect to the solids content;
    wherein the at least one dispersed polyurethane comprises at least one acid functional group;
    the at least one acid functional group is at least partially neutralized with at least one hydrophilic base selected from the group consisting of an inorganic base and an organic mono-amine;
    the at least one hydrophilic base has a water solubility at 20° C. of at least 150 g/L; and
    the coating composition comprises no crosslinker for the at least one dispersed polyurethane.

2. The one-component aqueous coating composition of claim 1, wherein the at least one dispersed polyurethane comprises, in reacted form:
    (a) at least one organic diisocyanate of formula $X(NCO)_2$;
        where X is a noncyclic aliphatic hydrocarbon radical having 4 to 15 carbon atoms, a cycloaliphatic hydrocarbon radical having 6 to 15 carbon atoms, an aromatic hydrocarbon radical having 6 to 15 carbon atoms, or an araliphatic hydrocarbon radical having 7 to 15 carbon atoms;
    (b) at least one dihydroxy compound selected from the group consisting of a polyester diol, a polyether diol, and a polycarbonate diol;
    (c) at least one compound comprising:
        at least one functional group reactive toward an isocyanate functional group; and
        at least one acid functional group; and
    (d) optionally, at least one compound different from the compounds comprised by (a) to (c).

3. The one-component aqueous coating composition of claim 1, wherein the at least one hydrophilic base is selected from the group consisting of an inorganic metal salt and ammonia.

TABLE 1

Barrier properties of polyurethane-based coatings

| Example | description | OTR $[cm^3 \, m^{-2} \, day^{-1} \, bar^{-1}]$ | $O_2$ permeation $[\mu m \, cm^3 \, m^{-2} \, day^{-1} \, bar^{-1}]$ | WVTR $[g \, m^{-2} \, day^{-1}]$ |
|---|---|---|---|---|
| — | neat PET foil | 33 | — | |
| C2 | pure PUD-A | 32.1 | 51.4 | |
| 2 | PUD-A + 20% L-hect | 02.7 | 04.6 | 0.9 |
| C3 | pure PUD-B | 32.6 | 52.1 | |
| 3 | PUD-B + 20% L-hect | 04.6 | 08.5 | 1.1 |
| C4 | pure PUD-C | 31.8 | 50.8 | |
| 4a | PUD-C + 20% L-hect | 00.7 | 01.1 | 0.4 |
| 4b | PUD-C + 20% Na-hect | 01.9 | 02.9 | |
| C5 | pure PUD-D | 31.4 | 50.2 | |
| 5a | PUD-D + 20% L-hect | 00.8 | 01.3 | 0.5 |
| 5b | PUD-D + 50% L-hect | 00.3 | 00.5 | |
| C6 | pure PUD-E | 35.6 | 57.0 | |
| 6 | PUD-E + 20% L-hect | 01.6 | 02.7 | 1.6 |
| C7 | pure PUD-F | 36.5 | 58.4 | |
| 7 | PUD-F + 20% L-hect | 04.2 | 07.7 | 0.9 |
| C8 | pure PUD-G | 30.2 | 48.4 | |
| C8a | PUD-G + 20% L-hect | not determinable, formulation unstable | | |

4. The one-component aqueous coating composition of claim 1, wherein a degree of neutralization of a total molar amount of the at least one acid functional group is in a range of 30 to 100 mol %.

5. The one-component aqueous coating composition of claim 1, wherein a weight ratio of the at least one dispersed polyurethane to the at least one phyllosilicate is in a range of 95:5 to 50:50.

6. The one-component aqueous coating composition of claim 1, wherein the at least one phyllosilicate is an exfoliated organically modified smectite.

7. The one-component aqueous coating composition of claim 1, wherein the at least one phyllosilicate is a natural or synthetic phyllosilicate with an aspect ratio greater than 400.

8. The one-component aqueous coating composition of claim 1, wherein the at least one phyllosilicate is a synthetic smectite of formula $[M_{n/valency}]^{inter}[M^I_m \ M^{II}_o]^{oct}[Si_4]^{tet} O_{10}Y_2$, wherein M is:
  a metal cation with an oxidation state in a range of 1 to 3; or
  $H^+$;
$M^I$ is a metal cation with an oxidation state of 2 or 3;
$M^{II}$ is a metal cation with an oxidation state of 1 or 2;
O is oxygen;
Y is a mono-anion;
m is:
  ≤2.0 for each $M^I$ metal cation with an oxidation state of 3; and
  ≤3.0 for each $M^I$ metal cation with an oxidation state of 2;
o is ≤1.0, and
n, the layer charge, is in a range of greater than or equal to 0.01 to lower than or equal to 2.0.

9. The one-component aqueous coating composition of claim 1, wherein a surface of the at least one phyllosilicate comprises at least one organic compound having at least one functional group selected from the group consisting of an amino functional group and an ammonium functional group.

10. The one-component aqueous coating composition of claim 1, wherein the at least one phyllosilicate is:
  (a) produced hydrothermally; or
  (b) produced by high-temperature melt synthesis and, subsequently, at least one selected from the group consisting of exfoliation and delamination.

11. The one-component aqueous coating composition of claim 1, wherein the at least one dispersed polyurethane is semi-crystalline.

12. A polymer film, coated with the one-component aqueous coating composition of claim 1.

13. The polymer film of claim 12, wherein an oxygen transmission rate of the polymer film after coating is less than 40% of an oxygen transmission rate of the polymer film before coating, both rates being measured at 25° C. and 75% relative humidity.

14. The polymer film of claim 12, wherein the polymer film comprises at least one material selected from the group consisting of a polyethylene terephthalate, an oriented polypropylene, a polyethylene, a casted polypropylene, a biodegradable aliphatic-aromatic copolyester, a metalized polyethylene terephthalate, a metalized oriented polypropylene, and a polyamide;
  wherein a thickness of a coating layer is in a range of 0.2 to 50 µm after drying.

15. A package, comprising the polymer film of claim 12.

16. A method of coating a polymeric film with the one-component aqueous coating composition of claim 1, the method comprising:
  (a) contacting at least one side of the polymeric film with the one-component aqueous coating composition; and
  (b) drying the one-component aqueous coating composition of (a) to form a barrier coating on the polymeric film.

17. A method of providing oxygen barrier properties to an article, the method comprising contacting a surface of the article with the aqueous coating composition of claim 1.

* * * * *